(12) United States Patent
Vandenbroucke et al.

(10) Patent No.: US 10,508,760 B2
(45) Date of Patent: Dec. 17, 2019

(54) STRIP FOR REINFORCEMENT OF A HOSE AND A METHOD OF MANUFACTURE THEREOF

(71) Applicant: NV Bekaert SA, Zwevegem (BE)

(72) Inventors: Ben Vandenbroucke, Anzegem (BE); Geert Braekevelt, Zwevegem (BE); Nadine Van De Velde, Harelbeke (BE); John Segur, Rogers, AR (US); Ann Lambrechts, Avelgem (BE)

(73) Assignee: NV BEKAERT SA, Zwevegem (BE)

( * ) Notice: Subject to any disclaimer, the term of this patent is extended or adjusted under 35 U.S.C. 154(b) by 16 days.

(21) Appl. No.: 15/737,827

(22) PCT Filed: Jul. 6, 2016

(86) PCT No.: PCT/EP2016/066009
§ 371 (c)(1),
(2) Date: Dec. 19, 2017

(87) PCT Pub. No.: WO2017/005805
PCT Pub. Date: Jan. 12, 2017

(65) Prior Publication Data
US 2019/0003619 A1    Jan. 3, 2019

(30) Foreign Application Priority Data
Jul. 8, 2015   (EP) ...................................... 15175792

(51) Int. Cl.
*F16L 11/08*        (2006.01)
*B32B 15/08*        (2006.01)
(Continued)

(52) U.S. Cl.
CPC ............ *F16L 11/085* (2013.01); *B32B 15/08* (2013.01); *B32B 27/302* (2013.01); *C08J 3/05* (2013.01);
(Continued)

(58) Field of Classification Search
CPC ......... F16L 11/085; F16L 11/08; B32B 15/08; B32B 27/302; B32B 2597/00; C08J 3/05;
(Continued)

(56) References Cited

U.S. PATENT DOCUMENTS

| | | | | |
|---|---|---|---|---|
| 1,774,748 A | * | 9/1930 | Gore | ....................... B60C 15/04 |
| | | | | 152/540 |
| 1,849,781 A | * | 3/1932 | Arms | ....................... B60C 15/04 |
| | | | | 245/1.5 |

(Continued)

FOREIGN PATENT DOCUMENTS

| | | |
|---|---|---|
| WO | 01/92771 | 12/2001 |
| WO | 2005/108846 | 11/2005 |

(Continued)

OTHER PUBLICATIONS

International Search Report in PCT/EP2016/066009 dated Oct. 4, 2016.

*Primary Examiner* — Craig M Schneider
*Assistant Examiner* — David R Deal
(74) *Attorney, Agent, or Firm* — Wenderoth, Lind & Ponack, L.L.P.

(57) ABSTRACT

A strip (100) intended for the reinforcement of the wall of high pressure hoses or flexible pipes is presented. The strip (100) comprises multiple wires (102) arranged side-by-side and held together by means of a hardened adhesive (104) originating from a waterborne dispersion. Different embodiments are presented wherein the wires (102) are embedded in the hardened adhesive (104), or wherein only one side of the strip (100) is covered with hardened adhesive (104) or wherein the hardened adhesive (104) is present only between the wires (102) and not on the surfaces (S1, S2) delineating the strip (100). In one preferred embodiment the (Continued)

wires (102) are flattened with the flats being parallel to the surfaces (S1, S2) of the strips (100).

20 Claims, 2 Drawing Sheets

(51) Int. Cl.
*B32B 27/30* (2006.01)
*C08J 3/05* (2006.01)

(52) U.S. Cl.
CPC .......... *F16L 11/08* (2013.01); *B32B 2597/00* (2013.01); *C08J 2300/22* (2013.01); *C08J 2325/06* (2013.01); *C08J 2375/04* (2013.01); *C08J 2377/00* (2013.01); *C08J 2467/00* (2013.01)

(58) Field of Classification Search
CPC ................ C08J 2300/22; C08J 2325/06; C08J 2375/04; C08J 2377/00; C08J 2467/00
See application file for complete search history.

(56) References Cited

U.S. PATENT DOCUMENTS

| | | | |
|---|---|---|---|
| 3,857,726 A | 12/1974 | Van Gils | |
| 4,259,991 A * | 4/1981 | Kutnyak | F16L 11/08 138/127 |
| 4,275,937 A * | 6/1981 | Belofsky | F16L 11/086 138/127 |
| 4,486,477 A * | 12/1984 | Mirza | C08J 5/06 152/451 |
| 4,718,224 A * | 1/1988 | Obata | D07B 1/062 428/371 |
| 4,741,087 A * | 5/1988 | Plummer, Jr. | B29C 61/0658 138/123 |
| 4,802,510 A * | 2/1989 | Berlincourt | B29C 70/10 138/125 |
| 4,840,214 A | 6/1989 | Bourgois | |
| 4,952,262 A * | 8/1990 | Washkewicz | B29D 23/001 156/149 |
| 5,762,733 A * | 6/1998 | Miyazono | B60C 9/00 152/451 |
| 6,171,295 B1 * | 1/2001 | Garabedian | A61M 25/005 604/264 |
| 6,883,551 B2 * | 4/2005 | Bourgois | D04C 1/06 138/127 |
| 2002/0061409 A1 | 5/2002 | Topp et al. | |
| 2004/0025953 A1 * | 2/2004 | Fraser | F16L 9/12 138/133 |

FOREIGN PATENT DOCUMENTS

| | | |
|---|---|---|
| WO | 2007/009873 | 1/2007 |
| WO | 2015/000773 | 1/2015 |

* cited by examiner

STRIP FOR REINFORCEMENT OF A HOSE AND A METHOD OF MANUFACTURE THEREOF

TECHNICAL FIELD

The invention relates to reinforcement materials for hoses such as high pressure hoses made by braiding or spiralling reinforcement material around a core body. More particularly the reinforcement material comprises steel wires arranged into a reinforcement strip.

BACKGROUND ART

Hoses are useful for transporting fluid, conveying power or transmitting pressure in all kinds of applications. A hose comprises an internal polymer lining or tube to keep the fluid inside and a reinforced wall to withstand the pressure of the fluid. The product of pressure in a hose and its diameter must not exceed twice the strength of the wall reinforcement per unit length as otherwise the hose will burst. Adequate safety factors have to be taken into account for all kinds of losses emanating from the build of the hose and the intended use of the hose.

The reinforcement in the wall is therefore chosen as a function of the pressure that has to be held by the hose. For high pressure hoses (operating above 7 MPa) generally steel wire is chosen as reinforcement as it combines the required strength with flexibility, adhesion, and a predictable lifetime. In order to protect the steel wire from outside influences it may be covered with a polymer mantle such as an extruded rubber cover although the reinforcement may also remain visible when for example stainless steel types of wires are used.

The reinforcing wires are applied around the inner tube through braiding or spiralling or even sometimes a combination of both. In a spiralled hose consecutive layers of parallel steel wires are wound around the inner polymer tube in alternating directions with different lay lengths. In braiding, ribbons of parallel steel wires are maypole braided around the inner tube. A circular weaving pattern emerges that can have many arrangements such as plain, twill or satin weave. In a braided reinforcement the number of crossovers per unit length i.e. places where a ribbon in one direction crosses a ribbon in the other direction is reduced to a minimum. This can be done by broadening the ribbon i.e. by taking more filaments into the ribbon or by using a 2×2 twill (2 over, 2 under), 3×3 twill (3 over, three under) or even satin weave.

In both braiding and spiralling steel wire ribbons are given a certain degree of preforming by guiding them over a performer pin prior to embedding them into the layer of a hose. By this preforming the wires obtain a helicoidal shape that fits the winding of the wires in the reinforcement layer.

The lay lengths are chosen in order to have as little as possible contraction or elongation of the hose in axial length when pressure is applied to the hose. Therefore lay angles—the angle between the axis of the hose and the reinforcement—are kept close to the 'neutral angle' that is $A\tan(\sqrt{2})$ or about 54°44'.

Recent attempts have been made to further improve the performance of hoses by:
- Using crimped or bent wires in order to tune the mechanical properties of subsequent layers better to one another (WO 2015/000773 A1);
- Using flattened high-tensile wires (WO 2005/108846 A1). Flattened high-tensile wires have a higher ductility than the round wires they originate from. This makes the wire better suited for incorporation into a hose. Also flattened wires result in an overall lower thickness of the hose. Further, at the cross-overs, flat wire surfaces are in contact with one another, thereby reducing the transversal contact stresses. Round wires—in particular high and ultra-high tensile strength wires—are prone to loss in breaking load when subject to transversal stresses. Moreover the round-on-round contacts at the crossovers result in increased erosion fatigue when the hose is dynamically loaded resulting in an early failure of the hose. Although the use of flattened steel reinforcement wires results in improved hoses, the processing of the flattened wires into a ribbon is not easy as sometimes a single flattened wire tends to twist, thereby creating a spot in the hose that can succumb when the hose is pressurised.
- Using strips of steel wires or steel cords embedded in a polymer (WO 2001/092771 A1). However, with this kind of arrangement not enough 'transversal strength' can be obtained. With 'transversal strength' is meant the breaking force of the strip divided by the width of the strip. There must remain a substantial amount of polymer in between the steel wires or steel cords to keep them together in a strip. Moreover, the polymer encapsulation inhibits the use of the strip in a machine with preformers.
- In this respect it has been suggested to preform the polymer strips with steel cords embedded during manufacturing (WO 2007/009873 A2). But also there the problem remains that the 'transversal strength' is inferior to what can be achieved with the prior art ribbons.

Generally, hose reinforcement wire is covered with a brass coating to enable adhesion to rubber. However, there are a lot of alternative organic coatings that have been suggested in order to have a steel surface adhere to a rubber or polymer. The most notable are those compounds having two functional groups: one directed for adhesion to the polymer, one directed for co-valent bonding to steel. See e.g. US2002/0061409, U.S. Pat. No. 3,857,726 and references therein. These systems focus on having a good bond transition between the steel wire with a high modulus and the low modulus of the rubber or polymer in which the steel wire is intended to be used. It is not an object of these disclosures to bond steel wires to one another with sufficient mechanical strength.

The inventors have therefore sought other ways to solve the problems mentioned.

DISCLOSURE OF INVENTION

The object of the invention is to provide a reinforcement material for hoses that eliminates certain processing steps at the hose manufacturer such as e.g. the parallel rewinding of the steel wires bundles. It is also an object of the invention to provide a reinforcement strip of steel wires that is mechanically stable to survive the braiding or spiralling at the hose manufacturer. It is a further object of the invention to facilitate the use of flattened steel wires in the production process of hoses. It is an even further object of the invention to provide a reinforcement material that offers an adapted adhesion to rubber. A method to produce the reinforcement strip is provided.

According to a first aspect of the invention, a reinforcement strip is presented to reinforce a hose, preferably a high pressure hose. The strip comprises multiple steel wires arranged parallel to one another in a side-by-side relationship in a single layer in between a first and second surface. With 'side-by-side relationship in a single layer' is meant that the steel wires only touch, are in contact with their adjacent neighbour and no other wires. The contact is as close as possible meaning that there is no intentional separation or spacing between the steel wires. A close contact enables to reach a high strength per transversal unit of length or 'transversal strength'. The strip has a first side and an opposite second side in the width and length dimension of the strip. The length of the strip is its largest dimension, the thickness of the strip is the smallest and the width is the dimension intermediate in magnitude between length and thickness. With the 'surface of the strip' is meant the local plane that is tangent to all wires. There is a first surface at the first side of the strip and there is a second surface at the second side. All wires are situated in between the first and second surface.

In a more restrictive first aspect of the invention the above defined reinforcement strip is only useful for reinforcing hoses, by preference high pressure hoses. In the restricted aspect of the invention whenever 'reinforcement strip' is mentioned in what follows it is to be substituted by 'hose reinforcement strip'.

With steel wires particularly but not exclusively hose reinforcement steel wires are meant. Generally these steel wires are single filaments of far drawn high carbon steel. With high carbon steel is meant a steel with a composition that has a minimum carbon content of 0.65%, a manganese content ranging from 0.40% to 0.70%, a silicon content ranging from 0.15% to 0.30%, a maximum sulphur content of 0.03%, a maximum phosphorus content of 0.30%, all percentages being percentages by weight. There are only traces of copper, nickel and/or chromium. This is a preferred composition for obtaining normal tensile hose reinforcement wire with a tensile strength between 2450 and 2750 N/mm$^2$.

For obtaining high tensile strength hose reinforcement wires i.e. a steel wire with a tensile strength between 2750 to 3050 N/mm$^2$ one generally uses steel with a minimum carbon content of around 0.80 weight %, e.g. 0.78-0.82 weight % while the remaining elements are similar.

Even higher tensile strengths can be obtained by drawing the steel wire further i.e. by applying a higher elongation during drawing. In this way tensile strengths of between 3050 to 3350 N/mm$^2$ can be obtained. This is called Super Tensile hose reinforcement wire.

The wall strength of the hose is directly proportional to the transversal strength of the reinforcement strip hence determines the burst pressure of the hose. The transversal strength is the breaking force of the reinforcement strip divided by its width and is expressed in N/mm. Using high tensile or even super tensile hose reinforcement wire can also lead to the elimination of a reinforcement layer in the wall. For the purpose of this invention it is preferred that the transversal strength of the reinforcement strip is larger than $(2350-1767 \times d) \times d$ N/mm wherein 'd' is the equivalent diameter of the cross section of the steel wire expressed in mm. If the cross section of a steel wire shows a non-circular cross section, for example a flattened cross section, the 'equivalent diameter' is to be used. That is the diameter of a circle having the same surface area as the cross section perpendicular to the axis of the steel wire. Instead, the transversal strength of the reinforcement strip can be above $(2550-1767 \times d) \times d$ or even above $(2750-1767 \times d) \times d$.

Alternatively—for special applications wherein corrosion is a risk—hose reinforcement wire made from stainless steels may be used. Preferred stainless steels contain a minimum of 12% Cr and a substantial amount of nickel. More preferred stainless steel compositions are austenitic stainless steels as these can easily be drawn to fine diameters. The more preferred compositions are those known in the art as AISI 302 (particularly the 'Heading Quality' HQ), AISI 301, AISI 304 and AISI 314. 'AISI' is the abbreviation of 'American Iron and Steel Institute'. The tensile strength of stainless steel type wires is between 2050 and 2450 N/mm$^2$.

The number of steel wires in the reinforcement strip will depend on the build of the hose. Typically this is between 6 and 12 wires for braided hoses. For spiralled hoses more steel wires in the reinforcement strip will result in a faster winding hence a more productive way of making the hose. There the limitation is determined by what the spiralling machine can handle. A total width of up to 50 mm is achievable for example by winding a reinforcement strip of 72 wires of 0.70 mm next to one another.

The equivalent diameter of the individual steel wires is between 0.15 mm and 0.80 mm the limits of the range being included. More preferred is an equivalent diameter between 0.15 to 0.35 mm for braiding and 0.30 to 0.80 mm for spiralling. When the equivalent diameter of the steel wires is larger than 0.80 mm the reinforcement strip as a whole becomes too stiff and difficult to bend and deform. When the equivalent diameter of the steel wires is smaller than 0.15 mm it becomes difficult to hold the wires together by means of a hardened adhesive Indeed, characteristic about the reinforcement strip is that the individual steel wires are held together by means of a hardened adhesive. The hardened adhesive is obtained by drying or by curing out of a waterborne dispersion. With a 'waterborne dispersion' or 'latex' is—for the purpose of this application—meant a liquid phase that comprises water wherein polymer particles are mixed. The liquid phase (i.e. excluding solid particles) comprises at least 40% and preferably 50% in weight of water. Other liquid components can be solvents such as alcohol, ethers or esters or any other volatile organic compounds (VOC's) and additives such as surfactants, anti-foam agents, pH stabilisers, colorants and similar compounds. The polymer particles preferably have a size of between 1 nanometer to 1 micrometer. If the polymer particles are larger—say larger than 1 µm—the dispersion is coarse and becomes more difficult to apply (a 'coarse dispersion' is called a 'suspension'). The polymer is present in the small particles.

The hardened adhesive can be obtained by means of drying or curing. In the case of drying the liquid component is removed and the particles coalesce on the substrate. The coalescence can be improved by preheating the substrate surface. This results in a better closed adhesive film. In the case of curing, the formation of the hardened adhesive is accompanied with a polymerisation reaction between constituents of the adhesive or with ambient molecules (e.g. water or oxygen in ambient air).

In a preferred embodiment, the hardened adhesive does not re-dissolve in liquid polar media. Water and alcohol for instance ethyl alcohol are examples of liquid polar media.

In the most general case the multiple steel wires are embedded, encased, surrounded by the hardened adhesive. If the adhesive is adapted to adhere not only to a metal but also to rubber this is not a problem. However, this full embedment is less preferred if the hardened adhesive does not adhere or does not adhere enough to the rubber of the hose as this would adversely affect the behaviour of the composite hose wall.

A preferred embodiment is therefore that predominantly the first or second side of the strip is partly or completely covered with hardened adhesive but not both sides. The presence of hardened adhesive can be ascertained by making a cross section of the reinforcement strip perpendicular to the length direction of the strip. By proper dying of the cross section, the hardened adhesive can be made to appear. The amount of hardened adhesive can be established by standard image analysis techniques.

With 'predominantly' is meant that more than half, for example 60%, or even more than 70, 80, 85 up to 99% of the total volume of the hardened adhesive is present at one side of the strip, the separation line being the middle plane between the first and second surface. With 'partly covered with hardened adhesive' is meant that locally some steel wire surface may still be exposed to air at the predominantly covered side. When the side is completely covered, the steel wires surface at that side is completely sealed by the hardened adhesive.

The side that remains substantially free of hardened adhesive can then still make adhesive contact with the rubber of the hose wall. With 'substantially free' is meant that still some hardened adhesive may be present on the side that is not completely or partly covered, but this amount must be minimal for example less than 40% of the total volume of hardened adhesive. This amount also includes the hardened adhesive that may be present in between the wires above the middle plane of the strip at the side that is not partly or completely covered. Even more preferred is that this amount is lower than 30% or even lower than 20% of the total volume of hardened adhesive. Amounts above the middle plane of the strip of between 1% and less than 15% of the total volume of hardened adhesive are possible according the inventors.

In another preferred embodiment of the reinforcement strip the hardened adhesive is predominantly present between the first and second surface. This means that the adhesive can mainly be found between the wires and not outside the first and second surface. With 'predominantly' is meant that in cross section of the reinforcement strip wherein the hardened adhesive can be discerned from the multiple steel at least 70 or even more than 80 or 90% or more of the hardened adhesive can be found in between the first and second surface. This leaves more of the outer surfaces of the reinforcement strip available for adhesion with the rubber.

A further particularly preferred embodiment is wherein all of said steel wires have at least one flat face for example one or two or more flat faces and wherein said at least one face is in, coincides with, lays in either the first or second surface. When all wires have one flat face, the flat face must be in either the first or the second surface i.e. all wires are oriented identical. More preferred is if the steel wires have a first and second flat face, the first face laying in the first surface, the second face in the second surface. Hence, the first and second flat faces are parallel to one another. The faces can be obtained by flattening the wire by rolling against a roll or between two flattening rolls. Also preferred is if the wire has four flat faces for example is rectangular or substantially rectangular in cross section of which two parallel faces lay in the first or second surface. With 'substantially rectangular' is meant that the corners of the rectangle may still show some rounding.

The degree of flattening can be expressed as the ratio of the smallest to the largest calliper diameter (also named Feret diameters) in a cross section perpendicular to the axis of the wire. This ratio must be lower than or equal to 0.95 preferably lower than or equal to 0.90 but higher than or equal to 0.50, preferably higher than or equal to 0.60. Preferred ranges are therefore 0.50 to 0.95, 0.50 to 0.90, 0.60 to 0.95, 0.60 to 0.90.

This embodiment is particularly advantageous in that it facilitates the use of flat wires in hoses. As the flat wires are fixed to one another in the reinforcement strip, they cannot longer rotate around their axis and always take the best possible orientation in the hose. There is no rotation of individual wires possible.

In order to enable adhesion between the steel wires themselves and the rubber, the steel wires are coated with an adhesive layer. In case the hardened adhesive does not adhere well to rubber, the surface of the wires that are free from hardened adhesive can still make a bond. Typical metallic coatings enabling adhesion to rubbers are brass (an alloy of copper and zinc), bronze (an alloy of copper and tin), copper, zinc, or alloys thereof. Alternatively, adhesion between a metal and a rubber can also be obtained by means of an organic primer such as primers based on organofunctional silanes, organofunctional titanates or organofunctional zirconates.

A further particularly preferred embodiment is when the hardened adhesive adheres to any one of the group of thermoset elastomers consisting of styrene butadiene rubber (SBR), natural rubber (NR), nitrile butadiene rubber (NBR), hydrogenated nitrile butadiene rubber (HNBR), ethylene propylene-diene terpolymer (EPDM), chloroprene rubber (CR), chlorosulfonated polyethylene (CSM), chlorinated polyethylene (CM), fluorocarbon rubber (FKM), fluorosilicone rubber (FSI), silicon rubber (VMQ) or blends thereof. Hence the hardened adhesive does not only adhere the wires to one another to form a strip, but also adheres to the thermoset elastomer of the hose wall. Particularly SBR and NBR rubbers are popular to produce hoses. The hardened adhesive is then preferably a water based, low viscosity latex dispersion derived from the same type of rubber. For example a natural rubber based hardened adhesive is best used in case the hose wall is NR based.

Alternatively, for special purpose hoses, thermoplastic elastomers are used. In those cases it is advantageous to use an adhesive that—after hardening—adheres to any one out of the group of thermoplastic elastomers consisting of styrenics (SBC), olefinics (TPO), urethanes (TPU), polyesters (CPE), polyamids (PA), polyoxymethylins (POM) or blends thereof.

Possible adhesives that at least enable the adhesion between the steel wires after drying and curing out of a waterborne dispersion are polymers out of the group consisting of:

Polyvinyl acetate
Acrylic polymers and copolymers such as:
   Styrene-acrylate copolymer;
   Polyurethane-acrylate copolymer;
Epoxy copolymers:
Elastomeric polymers and copolymers such as:
   Resorcinol formaldehyde latex
   Water based dispersions of NR Particular preferred waterborne dispersions are mixtures of acrylic polymers and copolymers with elastomeric polymers and copolymers. The acrylic compounds result in a strong and stable glue between the steel wires but do not give any adhesion to the rubber. On the other hand the elastomeric compounds results in a good adhesion between the steel wire and the rubber but are not sufficient to keep the wires together in the strip. It appears that a mixture of these compounds provides sufficient mechanical strength to keep the wires together at least until being preformed while providing sufficient adhesion between the steel wires and the hardened adhesive as well as between the hardened adhesive and the rubber of the hose wall.

In order for the reinforcement strip to remain united during the braiding or spiralling of the reinforcement strip, the steel wires must attach to one another with a force of—on average over at least 4 measurements—at least 100 N over 20 mm in shear. More preferred is if the shear force is above 150 N, or even higher than 175 N all measured over 20 mm.

The amount of hardened adhesive can be determined by double weighing. A length of for example one meter of reinforcement strip is weighed and the hardened adhesive is removed by immersion in a—possibly heated—solvent. The steel wires—now individualised—are weighed again. The amount of hardened adhesive is expressed as the ratio of the difference in mass before and after hardened adhesive removal to the mass of the steel wires only. Preferably the amount of hardened adhesive does not exceed 100 gram per kilogram of reinforcement strip as otherwise the hardened adhesive may hamper the processing of the reinforcement strip. Even more preferred is if it is less than 80 gram per kilogram or 40 gram per kilogram or even less than 15 gram per kilogram. Below 40 g/kg about all hardened adhesive is present between the first and second surface when round wires are used. With carefull process control one can keep the amount of hardened adhesive below 10 g/kg. The lower, the better.

However, sufficient adhesive must be present in order to preserve the integrity of the reinforcement strip in subsequent processing. For example the individual steel wires must remain together at least till being preformed when being wound into the hose wall. If the wires separate after preforming, this is less of a problem as the orientation of the filaments remains anyhow. The inventors find an amount of 1 gram of hardened adhesive per kilogram of steel wire a reachable minimum. In case more than 2 gram per kilogram of reinforcement strip is present, the steel wires will keep their coherence also during preforming prior to being wound in the hose wall.

Any range of the amount of hardened adhesive wherein the lower limit is equal to any one of the minimal values mentioned in the directly preceding paragraph is combined with any one of the maximal values mentioned in the paragraph prior to the directly preceding paragraph as the included upper limit is herewith disclosed.

In a further preferred embodiment of the reinforcement strip, the strip has obtained a preforming i.e. the wires have been plastically deformed. The preforming is such that the reinforcement strip takes a helical shape i.e. forms a helix when freely suspended. With 'freely suspended' is meant that a turn of reinforcement strip is cut from a roll and hung under the action of gravity at one end. The preforming is such that the first or second surface of the reinforcement strip lays on a cylindrical surface of which the axis coincides with that of the helix. The advantage of giving a preforming is that the reinforcement strip remains well on the wound coil. Further less preforming—if at all—must be given to reinforcement strip prior to introducing it into the wall of the hose.

According a second aspect of the invention, a method is claimed to produce a reinforcement strip. The method comprises the following steps in the sequence given by the ordinal number (indicated with '#').

10: Multiple steel wires are provided. The steel wires can be unwound together from a creel of spools, or they can be guided directly from a drawing machine. The wires are kept under a moderate handling tension. The number of steel wires corresponds to the number of steel wires desired in the reinforcement strip. As usual in the art the steel wires are cleaned before further processing.

20: The wires are guided to a guide roll where they are arranged in a side by side configuration. To limit the space between the steel wires, a pair of side wheels are provided that push the steel wires together on the roll. The angle spanned on the guide roll and the tension given to the individual wires is sufficient to keep them in place and to prevent jump overs. If a large number of wires needs to be collated together, more than one guide roll with associated pairs of side rolls maybe needed. For example first the middle wires are collated together on a first roll with associated side wheels followed by the outer wires that are sideways added to the middle wires on a second guide roll with associated side wheels. The steel wires leave the guide roll organised as a strip with first and second side. The 'side' is spanned by the length and width dimension of the strip.

30 A waterborne adhesive is applied to the first side or the second side or to the first and second side of the strip. One sided coating of the strip is possible by using curtain coating where the strip moves through a laminar flowing curtain of continuously pouring adhesive. A cleaner one sided coating of the strip can be obtained by using an application roller contacting the underside of the strip wherein the roller is wetted by the waterborne adhesive as it turns through a container with the waterborne adhesive. Two sided coatings can be applied by guiding the complete strip into a dipping container. Also the adhesive can be applied by painting for example by a brush that is continuously fed with waterborne adhesive. Alternatively the waterborne adhesive can be applied by means of spraying.

40: After application of the waterborne adhesive it is cured or dried (depending on the type of adhesive) by heat for example by guiding the wet strip through a run-through oven. Alternatively infrared lamps can be used. Curing can also be initiated by ultraviolet irradiation with UV lamps provided the polymer of the adhesive is susceptible to UV curing.

50: By curing or drying the adhesive is hardened and this keeps the multiple steel wires together: a reinforcement strip results. The reinforcement strip is subsequently wound into a coil. For example by winding on a drum, spool or bobbin for further processing at the customer.

In a further preferred embodiment of the method, the steel wires are flattened by guiding them between two flattening rolls.

This can be done on each wire individually before they are collated on the guide roll as a step #15;

Alternatively, after the multiple steel wires have been collated into a strip they can be rolled between the flattening rolls collectively as a step #25: This is the most preferred way of working.

Still alternatively, after the waterborne adhesive has been applied on the strip, the multiple steel wires can be flattened collectively between the flattening rolls in a step #35. As a bonus, the superfluous waterborne adhesive is removed by the rolls.

In a still further alternative the multiple steel wires can be collectively flattened after the curing and drying in a step #45.

In order to control the amount of hardened adhesive on either side of the strip excess waterborne adhesive may be removed from the first and/or second side prior to the curing or drying step. By introducing a method step #32 wherein the excess waterborne adhesive is wiped form the first side of the strip a reinforcement tape can be obtained wherein the hardened adhesive at least partly covers the second side. The first side has considerably less hardened adhesive at its surface. Mutatis mutandis the method can be applied on the second side so that the hardened adhesive is predominantly present on the first side. If the wiping is done on both first and second side of the strip, a reinforcement strip is obtained wherein the hardened adhesives is predominantly present in between the first and second surface of the reinforcement strip. Wiping can be done with wiping pads, metal blades or by air knives or any other suitable means.

In an alternative embodiment of the method the superfluous hardened adhesive can be removed after curing or drying as a step #42. This can be done by means of scraping or brushing.

In a preferred embodiment of the method the steel wires are collectively heated before the waterborne adhesive is applied as a step #29. This improves the coalescence of the adhesive polymer particles and results in a better closed hardened adhesive film. Heating can be done by running through an oven or—more preferred—by induction heating.

In a further preferred embodiment the strip with adhesive in fresh or dried or cured condition is preformed by guiding the strip over a preforming roll. When the strip with adhesive is still in the fresh condition this can be introduced as a step #37, when the adhesive is dried or cured this can be added as a step #47. In order to induce a plastic deformation to the steel wire the diameter of the preforming roll must be sufficiently small to induce a stress that is higher than the yield stress of the steel wire at the outer side of the steel wire. Typically the diameter of the preforming roll must be smaller than 50 times the equivalent diameter of the steel wire in order to have a plastic deformation. The smaller the ratio of the preforming roll to the equivalent diameter of the wire is, the smaller the radius of the curvature of the resulting helix will be. At the other extreme this ratio should not be smaller than 5 times the equivalent diameter of the wire to prevent damage to the wire. More preferred is that the ratio is between 10 and 20.

When the axis of the preforming roll is oriented perpendicular to the length dimension of the strip the plastic bending is in the direction perpendicular to both i.e. the strip winds on itself. In order to obtain a helical preforming it suffices to put the preforming roll under an angle different from perpendicular to the length of the strip. The orientation of the angle will determine whether the helix forms into a right or left hand screw direction.

The resulting reinforcement strip can be supplied in sufficiently long lengths. As the width of the strip is still relatively small it can easily be wound or rewound on existing machinery. The use of the strip eliminates therefore the critical rewinding of several spools onto a single machine spool for use in a braiding or spiralling machine. Such rewinding must happen at equal tension as the slightest deviation in length between wires can result in braiding errors. Also cross overs of wires are prevented as the wires are arranged in position side-by-side. Further the reinforcement strip enables the use of flattened hose reinforcement wires.

BRIEF DESCRIPTION OF FIGURES IN THE DRAWINGS

In the figures references with equal tens and unit numbers refer to identical items while the hundred digit refers to the figure number.

MODE(S) FOR CARRYING OUT THE INVENTION

Figure 1:
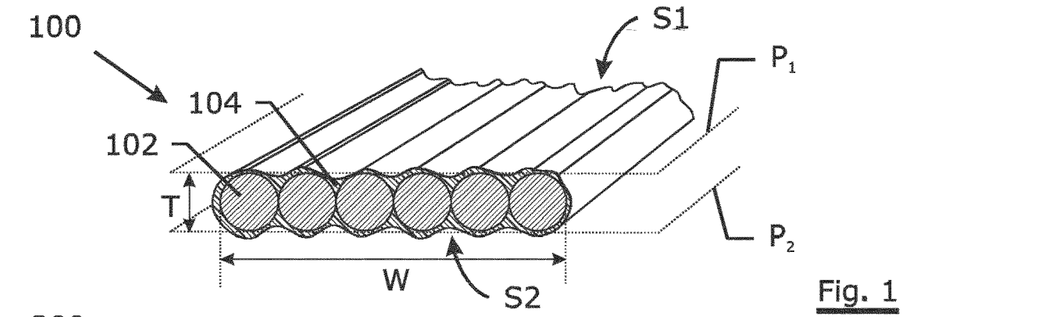
FIG. 1 shows the invention in its broadest possible form.

FIG. 1 illustrates the invention in its broadest possible form. The reinforcement strip 100 consists in this case of six steel wires 102 of size 0.30 mm and a tensile strength of 2955 N/mm$^2$ i.e. high tensile strength. The wires are brass coated in an amount of 5.1 grams per kilogram of wire. The composition is 67.3% copper by weight the remainder being zinc. The strips are arranged in a single layer, parallel side by side configuration. They are pushed against one another as close as possible without deforming them so that the width 'W' is close to the theoretical value of 6×0.30 or 1.80 mm. All the wires are encased in a hardened adhesive 104 that holds the individual wires together. The hardened adhesive is obtained by drying or curing of a waterborne dispersion.

The wires 102 are situated between two surfaces P1 and P2 that are tangent to the steel wires. In this case the hardened adhesive can be found as well in the recess formed between adjacent steel wires as outside of the two surfaces P1 and P2. It is present at both sides of the reinforcement strip 100. S1 indicates the first side of the strip, S2 the opposite side.

Figure 2:
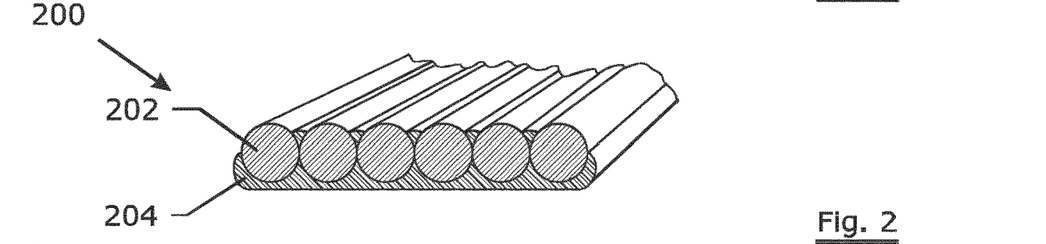
FIG. 2 shows a first preferred embodiment of the invention.

In a second preferred embodiment 200 depicted in FIG. 2, the hardened adhesive 204 is predominantly present on the second side of the reinforcement strip. In this embodiment the second side is completely covered with the hardened adhesive. The first side is substantially free of hardened adhesive. A minor amount—about 9% in volume of the total amount—of hardened adhesive is present in the recess formed between two wires at the side above the middle of the strip. This embodiment has the additional advantage that the first side of the reinforcement strip is not covered with hardened adhesive and remains available for adhesion to rubber.

This type of reinforcement is specifically suited for hoses with liners wherein the inner liner does not bond to the rubber wall for example because it is made of an inert polymer such as polytetrafluoroethylene (PTFE) or ethylene-tetrafluoroethylene (ETFE). The covered side can then be oriented towards the inner liner, while the opposite side connects to the rubber. Of course this reinforcement can be used in regular hoses as well for example in braided hoses where in the one braiding direction the covered side is oriented radially inward and in the other braiding direction the covered side is oriented radially outward.

Figure 3:
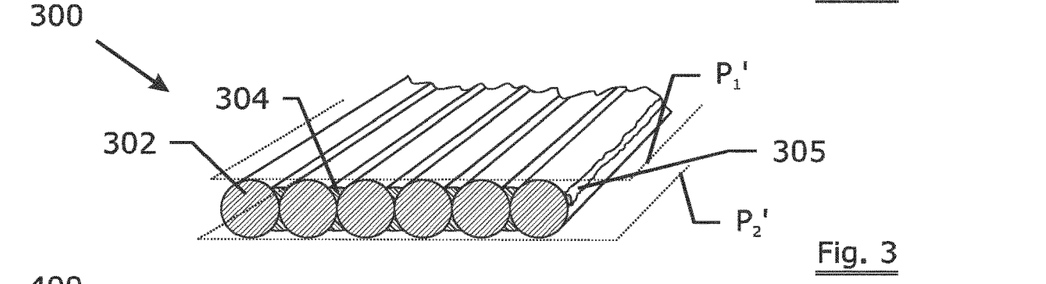
FIG. 3 shows a second preferred embodiment of the invention.

FIG. 3 shows a third preferred embodiment. In this embodiment, the hardened adhesive remains completely within the first and second surface (P1' and P2') tangent to the wires. Between 1 and 30 gram of hardened adhesive per kilogram steel wire is present. Both sides of the reinforcement strip therefore remain available for adhesion. Some hardened adhesive 305 may remain present at the outer sides of the reinforcement strip.

Figure 4:
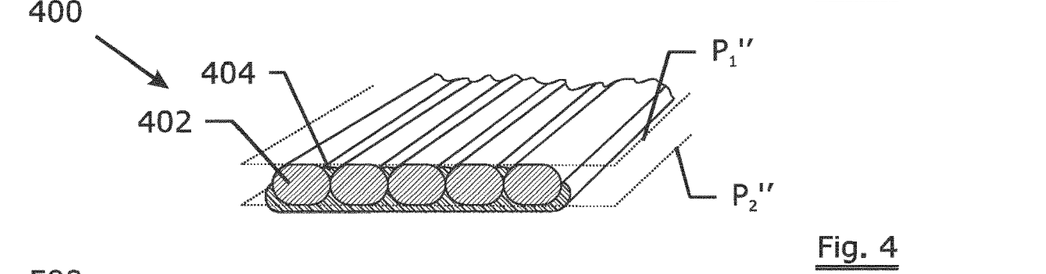
FIG. 4 shows a third preferred embodiment of the invention.

In FIG. 4 a fourth preferred embodiment is presented wherein the round steel wires are replaced with flattened steel wires. The flattened wires are obtained by rolling the 0.30 steel wires as above to a thickness of 0.23 mm. The width of the steel wire in the direction perpendicular to the thickness direction then becomes 0.34 mm. The tensile strength of the wire slightly decreases to 2866 N/mm$^2$ due to the rolling. Both flat faces are oriented in the first P1" and second P2" surface tangent to the steel wires.

Figure 5:
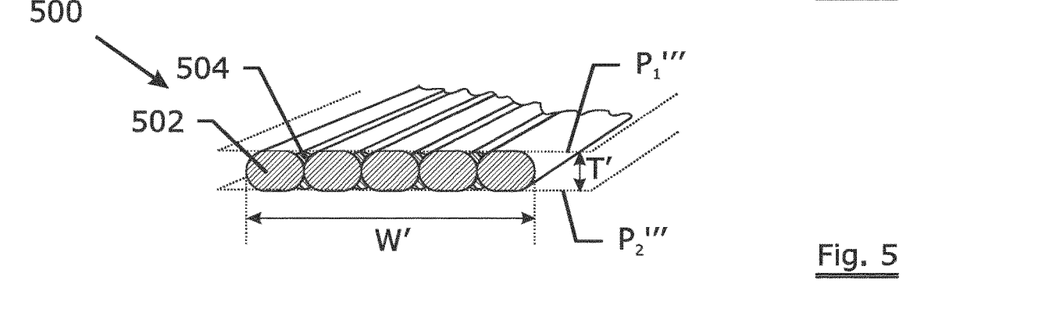
FIG. 5 shows a fourth preferred embodiment of the invention.

A much preferred fifth embodiment is depicted in FIG. 5. There the flattened wires 502 are held together with a minimum amount of hardened adhesive 504 present in between the recesses between adjacent wires. Such reinforcement strip immediately can substitute the multiple wound single hose reinforcement wires as currently used in hose braiding and spiralling machines.

In the preferred fourth and fifth embodiments there is a better filling degree of the reinforcement strip. The filling degree is the amount of metallic area in a perpendicular cross section of the strip divided by the width W' and thickness T'. Next to that the bending with axis parallel to the width direction of the strip is easier as the bending stiffness is lower. Further the flattening exposes more surface to the rubber resulting in a better adhesion.

Several waterborne dispersions have been evaluated. From those the following performed best:

Styrene acrylate copolymer: the hardened adhesive gives good mechanical properties and holds the steel wires well together. Adhesion to rubber is however low.

Carboxylated styrene butadiene latices give better adhesion to rubber but are mechanically less strong. The steel wires tend to separate after a preforming operation has been performed.

Mixtures of styrene acrylic copolymer and carboxylated styrene butadiene latex give good mechanical properties as well as good adhesive properties. As carboxylation of styrene butadiene rubber is generally performed by admixture of acrylic monomers, the mixture is compatible. Preferably more than 55% of the styrene is bound, for example in a range of between 55 to 75%.

The hardened adhesives mentioned do not re-dissolve in liquid polar media.

The inventors confirmed that the known adhesives for adhering a metal to a rubber such as Cilbond® (obtainable from Chemical Innovations Ltd) or Megum® (Dow) do not provide sufficient bonding between the steel wires. The film does not hold the steel wires together.

Figure 6:
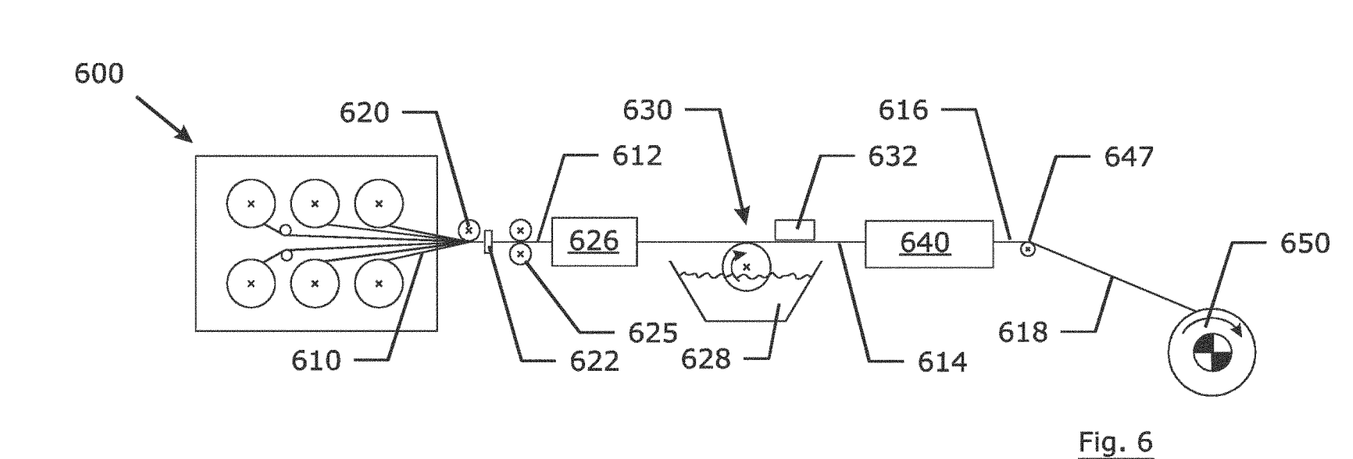
FIG. 6 shows an exemplary installation for performing the method.

The process used to make the reinforcement strip according the third embodiment is further illustrated in FIG. 6. In the installation 600, six steel wires 610 are pulled from wire spools on a creel. The steel wires are assembled in a side-by-side configuration on guide roll 620. Two push rolls 622 mounted at either side of the strip push the wires together. Between the pair of hardened metal rolls 625 the round steel wires are flattened to a thickness of 77% of the original diameter of the steel wires resulting in a strip of loose, flattened wires 612 arranged side by side.

In a further step the wires in the strip are cleaned in a wet or dry process 626 for example by submerging in an alkaline solution followed by drying. In the applicator 630 a waterborne dispersion is applied through a rotating wheel 628 at the bottom side of the strip 612. Hence in this case the waterborne dispersion is applied by rolling. The wiper 632—that can be a mechanical knife or an air knife— removes any excess waterborne dispersion from the top side of the strip.

The wet strip 614 is then guided through an oven 640 wherein the waterborne dispersion is cured thereby forming a hardened adhesive holding the steel wires together thus forming reinforcement strip 616. By tensioning the reinforcement strip 616 over a rotating pin 647 the strip obtains a controlled preforming. With a tension of 10 N a free coil diameter of between 16 and 42 mm can be obtained by varying the pin diameter between 4 and 10 mm. The spanned angle on the pin is held at about 90°. The free coil diameter is the diameter of a piece of strip that is freely suspended at one point. If the rotating pin is perpendicular to the run direction of the strip, the strip will remain in a single plane. By putting the rotating pin under an angle deviating from 90° to the run direction of the strip but still in the plane of the entering strip a helix will form. Finally the preformed reinforcement strip 618 is wound onto a bobbin 650.

The other embodiments of the invention can be made by leaving out or adding components. For example the embodiment of FIG. 4 is made by pushing two flexible blade knives against both sides of the strip i.e. by doubling the wiper 632. Alternatively, embodiments with round wires (Like in the FIGS. 1 to 3) can be made by leaving out the pair of hardened rolls 625. Other possible combinations based on the tools provided can be implemented by the skilled person based on this disclosure.

Figure 7A:
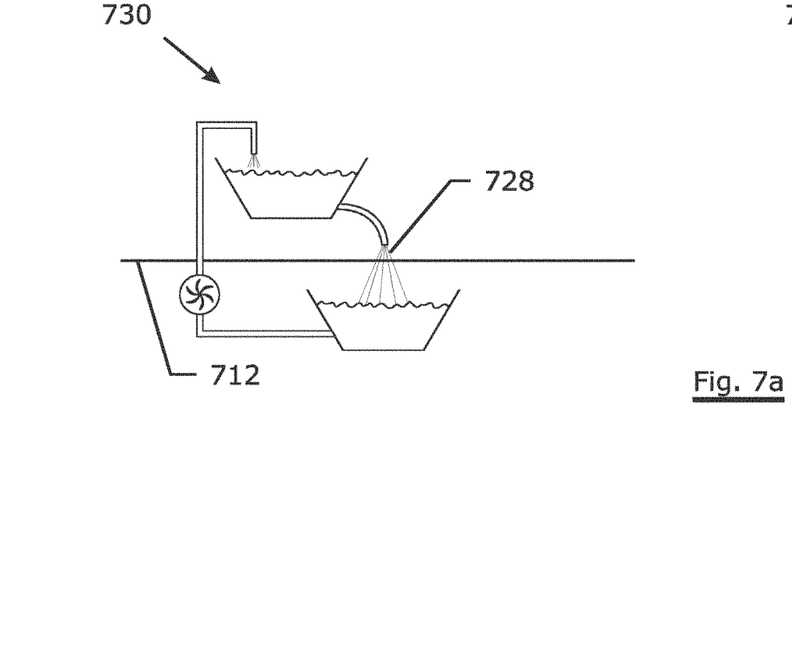
FIGS. 7a and 7b show alternative methods to apply the waterborne dispersion on the steel wires.
Figure 7B:
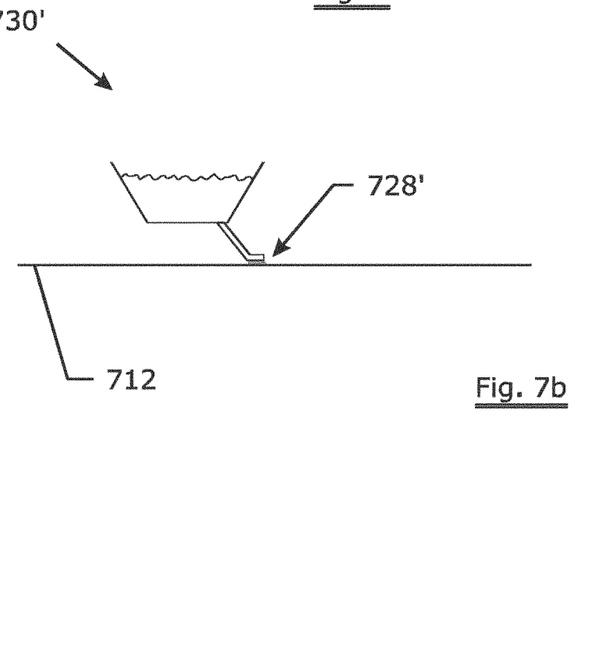

FIGS. 7a and 7b show different ways in which the waterborne dispersion can be applied on the intermediate wire strip 712. In FIG. 7a the waterborne adhesive is circulated and a curtain flow 728 applies the dispersion on the strip. In FIG. 7b the waterborne dispersion is applied through a sponge 728' that is fed from the container.

The following samples were made and tested:

5 steel wires of 0.30 mm where rolled flat to a size of 0.23□0.34 mm$^2$ (step #15). The width of the reinforcement strip was 1.7 mm. The wires were collated (step #20) and cleaned. The resulting strip was coated on one side by means of an application roller or on both sides by means of dipping in a waterborne adhesive. The superfluous amount of adhesive was removed prior to curing (step #32). Curing was done in a run-through oven for 50 seconds. This is the sample referred to as 5×(0.23□0.34).

8 steel wires of 0.25 mm where rolled flat to a size of (0.19□0.28). The width of the resulting strip was 2.24 mm. Adhesive was applied in the same manner as for the first sample. This is the sample called 8×(0.19□0.28).

Different waterborne adhesives (more than 20 different types) were tested. The best turned out to be Type 15 (T15) and Type 16 (T16). Type 15 is a carboxylated styrene-butadieen latex with 55% bound styrene, Type 16 is a waterbased emulsion of modified styrene-butadiene latex.

The strips were tested for adhesion in 3 industrial compounds. The results of the pull-out force (POF) when pulled out of a vulcanized rubber pad with a width of 24.5 mm are reproduced in Table 1a (for the sample 5×(0.23□0.34)) and Table 1b (for 8×(0.19□0.28)). The column 'Amount' mentions the amount of hardened adhesive found on the samples: '0' means no coating, '+' is an amount between more than 1 and less than 30 g/kg, '++' is between 30 and 70 g/kg and '+++' indicates an amount higher than 70 g/kg. The column 'Sides' indicates whether the adhesive was applied on one side only ('1') or if both sides have been coated ('2'). The pull-out force is expressed as a percentage of the pull-out on a strip not coated with adhesive.

The results indicate that the amount of coating is more important than whether one or both sides of the strip are coated. Although these reported results show a decrease after coating, there are compounds that show an increase when applying a hardened adhesive. These are compounds that show rather low adhesion values on the not adhesive coated steel wires.

TABLE 1a

5 × (0.23☐0.34)
Average of POF relative to not coated sample (%)

| Adhesive | Amount | Sides | Rubber1 | Rubber2 | Rubber3 |
|---|---|---|---|---|---|
| No | 0 |  | 100% | 100% | 100% |
| T15 | +++ | 1 | 63% | 50% | 66% |
| T15 | +++ | 2 | 65% | 41% | 66% |

TABLE 1b

8 × (0.19☐0.28)
Average of POF relative to not coated sample (%)

| Adhesive | Amount | Sides | Rubber1 | Rubber2 | Rubber3 |
|---|---|---|---|---|---|
| No | 0 |  | 100% | 100% | 100% |
| T15 | +++ | 1 | 69% | 67% | 81% |
| T15 | + | 2 | 80% | 51% | 69% |
| T15 | ++ | 2 | 59% | 30% | 47% |
| T15 | +++ | 2 | 64% | 62% | 79% |
| T16 | + | 2 | 85% | 59% | 76% |
| T16 | ++ | 2 | 69% | 44% | 61% |

Also the shear force that the reinforcement strip can sustain was investigated. To that end a piece of fabricated strip is selected and about half of the wires are cut at the lower end and the remaining wires at the upper end. In the middle a zone of 20 mm is kept wherein the middle pair of wires remain connected by the hardened adhesive. The lower and upper end are mounted into a test bench and slowly (30 mm/min) pulled apart while the maximum force is recorded.

On the 8×(0.19☐0.28) sample the following results were obtained:

TABLE 2

| Adhesive | Amount | Average (N) | STD (N) |
|---|---|---|---|
| T15 | + | 200 | 6 |
| T15 | ++ | 213 | 37 |
| T16 | + | 123 | 7 |
| T16 | ++ | 145 | 11 |

Although the hardened adhesive T16 showed slightly better results on adhesion it turns out to be less mechanically strong. The T15 adhesive therefore remains preferred as it better survives the complex wire path followed in a maypole braiding or spiralling operation.

The reinforcement strip can be used to reinforce a hose or flexible pipe or tube. When such strip is used the advantages mentioned will become apparent. When in a hose the described reinforcement strip is used, this is easily recognisable as remnants of the hardened adhesive will be easily identified.

The invention claimed is:

1. A reinforcement strip for reinforcement of a hose, said strip consisting of multiple steel wires and a hardened adhesive, said multiple steel wires being arranged in a single layer, parallel side-by-side configuration, wherein said steel wires are held to one another by means of said hardened adhesive, said hardened adhesive being dried or cured out of a waterborne dispersion, wherein said waterborne dispersion is a watery dispersion, emulsion or solution of a mixture comprising
   one selected from the group consisting of acrylic polymers and copolymers, and
   one selected from the group consisting of elastomeric polymers.

2. The reinforcement strip of claim 1, wherein said hardened adhesive does not re-dissolve in liquid polar media.

3. The reinforcement strip according to claim 1, wherein the amount of hardened adhesive is larger than 1 gram per kilogram of steel wires and smaller than 100 gram per kilogram of steel wires.

4. The reinforcement strip according to claim 1, said reinforcement strip having a first and second side wherein said hardened adhesive predominantly partly or completely covers said first or second side.

5. The reinforcement strip according to claim 1, said reinforcement strip having a first and second surface tangent to said multiple wires wherein said hardened adhesive is predominantly present between said first and second surface.

6. The reinforcement strip according to claim 5, wherein each one of said steel wires comprises at least one flat face, said at least one face being in said first or second surface or wherein each one of said steel wires comprises at least a first and second flat face, said first flat face being in said first surface and said second flat face being in said second surface.

7. The reinforcement strip according to claim 1, wherein said steel wires are coated with a metallic coating selected from the group consisting of brass, bronze, copper, zinc, and alloys thereof.

8. The reinforcement strip according to claim 1, wherein said hardened adhesive adheres to any one out of the group of thermoset elastomers consisting of styrene butadiene rubber, natural rubber, nitrile butadiene rubber, hydrogenated nitrile butadiene rubber, ethylene propylene- diene terpolymer, chloroprene rubber, chlorosulfonanted polyethylene, chlorinated polyethylene, fluorocarbon rubber, fluorosilicone rubber, silicon rubber or blends thereof.

9. The reinforcement strip according to claim 1, wherein said hardened adhesive adheres to any one out of the group of thermoplastic elastomers consisting of styrenics, olefinics, urethanes, polyesters, polyamids, polyoxymethylins or blends thereof.

10. The reinforcement strip according to claim 1, said reinforcement strip having a transversal strength in excess of $(2350-1767 \times d)*d$ in N/mm, wherein 'd' is the is the equivalent diameter of the cross section of said steel wires, expressed in mm.

11. The reinforcement strip according to claim 1, wherein said reinforcement strip has a helix shape when freely suspended.

12. A steel wire reinforced hose characterised in that the reinforcement of said hose comprises reinforcement strips according to claim 1.

13. The reinforcement strip according to claim 1 wherein said steel wires attach to one another with a force of —on average over at least 4 measurements —at least 100 N over 20 mm in shear.

14. The reinforcement strip according to claim 1 wherein said waterborne dispersion is a watery dispersion, emulsion or solution of a mixture comprising styrene acrylic copolymer and carboxylated styrene butadiene.

15. A method to produce a reinforcement strip comprising in sequence the steps of:
   #10. Providing multiple steel wires;
   #20. Guiding said multiple steel wires in a side by side configuration on a guide roll, said multiple steel wires thereby forming a strip, said strip having a first and second side;
   #29. Heating said steel wires;
   #30. Applying a waterborne dispersion to said first and/or second side of said strip by pouring, dipping, rolling, painting or spraying;
   #40. Curing or drying said waterborne dispersion by heat, infrared or ultraviolet irradiation thereby forming a hardened adhesive holding the steel wires together thereby forming the reinforcement strip;
   #50. Winding the reinforcement strip into a coil.

16. The method according to claim 15 further comprising the step of:
   Flattening said steel wires by guiding them between two flattening rolls;
   as a step #15 or #25 or #35 or #45.

17. The method according to claim 15 further comprising the step of:
   Wiping waterborne dispersion from said first and/or second sides of said reinforcement strip;
   as a step #32.

18. A method to produce a reinforcement strip comprising in sequence the steps of:
   #10. Providing multiple steel wires;
   #20. Guiding said multiple steel wires in a side by side configuration on a guide roll, said multiple steel wires thereby forming a strip, said strip having a first and second side;
   #30. Applying a waterborne dispersion to said first and/or second side of said strip by pouring, dipping, rolling, painting or spraying;
   #40. Curing or drying said waterborne dispersion by heat, infrared or ultraviolet irradiation thereby forming a hardened adhesive holding the steel wires together thereby forming the reinforcement strip;
   #50. Winding the reinforcement strip into a coil
further comprising the step of:
   Preforming said reinforcement strip by guiding said reinforcement strip over a preforming roll;
   as a step #37 or #47.

19. The method according to claim 18 further comprising the step of:
   Flattening said steel wires by guiding them between two flattening rolls;
   as a step #15 or #25 or #35 or #45.

20. The method according to claim 18 further comprising the step of:
   Wiping waterborne dispersion from said first and/or second sides of said reinforcement strip;
   as a step #32.

* * * * *